Figure 1:
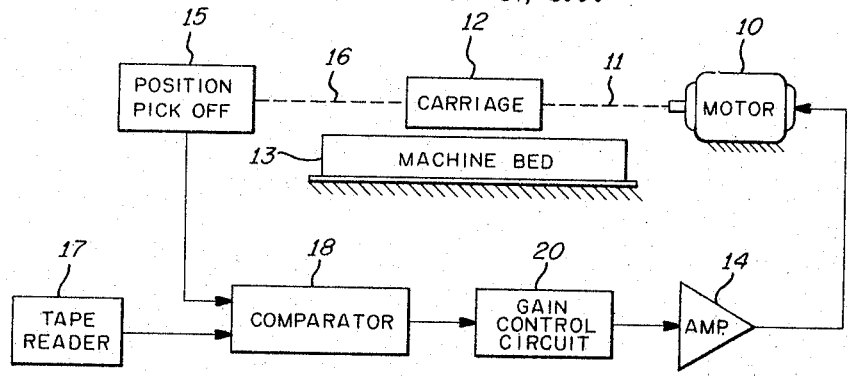

May 16, 1967 J. J. PAUL 3,320,502
AUTOMATIC GAIN CONTROL FOR SERVO SYSTEMS
Filed Feb. 17, 1964

INVENTOR.
JOHN J. PAUL
BY H P Terry
ATTORNEY

United States Patent Office 3,320,502
Patented May 16, 1967

3,320,502
AUTOMATIC GAIN CONTROL FOR SERVO SYSTEMS
John J. Paul, Montreal, Quebec, Canada, assignor to Sperry Gyroscope Company of Canada, Ltd., Montreal, Quebec, Canada
Filed Feb. 17, 1964, Ser. No. 345,232
Claims priority, application Canada, Jan. 24, 1964, 894,048
4 Claims. (Cl. 318—18)

The present invention relates to automatic gain control for servo systems having marginal stability. It is particularly suitable for numerical control positioning systems where it is necessary to reduce the servo loop gain while coming into position below the gain level utilized when in position in order to experience high gain and precise control when in position.

Other known methods of achieving this result include utilizing velocity feedback networks in the servo system. However, where the servo loop characteristics exhibit a low cutoff frequency particularly where there are variations with temperature and mechanical wear, the application of velocity feedback may not be feasible even with elaborate compensating networks. In addition where there is a requirement for a relatively fast "settling" time with a high rate of deceleration it is difficult to make accurate mechanical coupling between the moving and stationary members of the machine for utilizing of a tachometer generator, for example.

Another approach often used in preventing oscillation in marginal servo systems is the utilization of a network notched at the resonant frequency of the servo loop. This type of apparatus requires precise adjustment to the desired frequency and in many cases will adversely affect servo characteristics of the system in other respects, for example, by introducing a lag effect below the resonant frequency.

Another prior art approach is the use of switching devices such as relays to change the gain of the servo loop after the moving member has come to rest. This has proven too slow in certain systems and further it is inflexible.

Therefore, it is a primary object of the present invention to provide a simple automatic gain control circuit in which the gain is varied as a function of the input error signal.

It is an additional object of the present invention to provide an automatic gain control circuit for a servo system which makes the servo loop gain dependent upon the rate of change of the error signal amplitude.

It is another object of the present invention to provide a numerical control positioning system in which the servo loop gain is automatically reduced while coming into position below the gain level utilized when in position.

These and other objects are achieved by making the servo loop gain of a marginally stable servo system dependent upon the rate of change of the error signal level where the amplitude of the error signal is proportional to the instantaneous displacement of the moving member from its final position.

Figure 2:
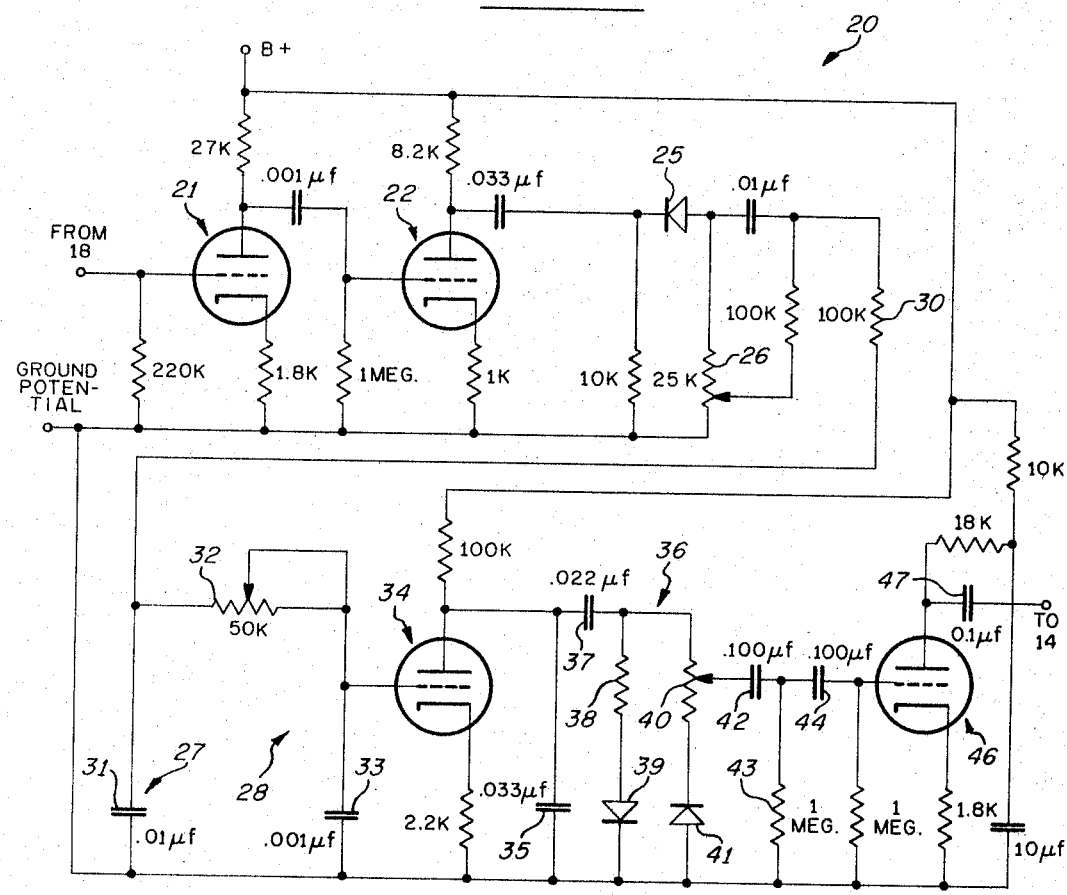

The invention will be described with reference to the accompanying drawings wherein:

FIG. 1 is a schematic block diagram of a numerical tool positioning control servo system incorporating the present invention; and FIG. 2 is an electrical schematic diagram of an automatic gain control circuit.

Referring to FIG. 1 the present invention will be explained with respect to a numerical control positioning servo system of the type shown in U.S. Patent No. 3,086,151, issued Apr. 16, 1963, to Peter J. Herzl, entitled, "Positional Control System and Pickoff Therefor." It will be appreciated that the present invention is applicable to other types of servo systems particularly those having marginal stability. In FIG. 1, a reversible motor 10 is mechanically coupled as schematically indicated by the dashed line 11 to a machine part such as a carriage 12 which is to be positioned with respect to a machine bed 13. The motor 10 is connected to be energized in response to the output of a servo amplifier 14. A position pickoff 15 is also coupled as indicated schematically by the dashed line 16 to the carriage 12 in order that the pickoff 15 provides an output signal representative of the position of the movable carriage 12. The pickoff signal from the position pickoff 16 is compared with a command signal from a tape reader 17 in a comparator 18. The command signal from the tape reader 17 is representative of a desired position of the carriage 12. Any difference between the actual position of the carriage 12 and the commanded position produces an error signal from the comparator 18 having an amplitude and phase representative of the amount and direction of the difference between the actual and commanded positions. The error signal is a relatively high frequency A.C. signal modulated in accordance with the error. The carrier frequency for example may be 2650 cycles per second. It is desirable particularly in numerical tool positioning control servo systems to have a higher servo loop gain when the tool bit is in position than when it is coming into position in order to accurately machine the desired contour. In order to automatically provide this change in gain the present invention includes a gain control circuit 20 connected between the comparator 18 and the amplifier 14 to reduce the servo loop gain while coming into position below the gain level when in position. The gain control circuit 20 may achieve this result by making the servo loop gain dependent upon the rate of decrease in the error signal level.

Referring to FIG. 2 a detailed schematic of the gain control circuit 20 is shown in which the A.C. error signal from the comparator 18 is amplified by a pair of RC coupled triode amplifiers 21 and 22. The signal at the output of the amplifier 22 is limited to about 20 volts peak to peak by the characteristics of the triodes 21 and 22 and the circuit components. The error signal is then half wave rectified by a diode 25 in order that the waveform of the error signal at the output of the diode 25 is a negative going half wave signal at, for example, 2650 cycles with a peak amplitude not exceeding 10 volts. A portion of the D.C. component of the rectified error signal can be selected by means of a potentiometer 26, for reasons to be explained. The composite error signal is filtered using two RC filter circuits 27 and 28 in tandem. The RC circuit 27 includes a resistor 30 and a capacitor 31 while the RC circuit 28 includes a variable resistor 32 and a capacitor 33. By means of the RC filter circuits 27 and 28, the amplitude of the A.C. carrier frequency component of the composite error signal is considerably attenuated without introducing any appreciable time constant. The filtered error signal is amplified in a triode amplifier 34 which has its output connected to capacitor 35. With the output of the amplifier 34 loaded by the capacitor 35, the gain of the carrier frequency component of the error signal will be less than unity utilizing circuit elements having values as indicated in FIG. 2 and thus the carrier frequency signal across the capacitor 35 will never be greater than approximately 0.2 volt R.M.S.

The other principal component of the error signal waveform at the output of the diode 25 is a negative voltage proportional to the amplitude of the signal at this point and therefore proportional to the error signal below the aforementioned limits. A portion of this voltage is selected by adjusting the potentiometer 26 and amplified by the amplifier 34. The rate of change of this portion is slow enough so that the filtering circuits 27 and 28 which attenuate the carrier frequency have a negligible effect on it. The amplifier 34 amplifies this voltage by a factor of approximately 20. If the amplified signal from the amplifier 34 is designated $K1 \cdot E$, the factor K1 is defined by the setting of the potentiometer 26.

The composite error signal at the output of the amplifier 34 is then of the form $K1 \cdot E + E \sin \omega T$ where E is proportional to the error signal,
K1 is dependent on the setting of the setting of the potentiometer 26, and
$\omega$ is $2\pi$ times the carrier frequency (e.g., 2560 cycles).

In order to provide a signal representative of the rate of decrease of the error signal, a differentiating network 36 including a capacitor 37 and a resistor 38 or alternatively a potentiometer 40 (depending upon the polarity of the current in a manner to be explained) is connected to the output of the amplifier 34. A positive differentiating current takes the path through the resistor 38 because of the poling of a silicon diode 39 while a negative differentiating current takes the path through the resistive winding of the potentiometer 40 because of the opposite poling of a silicon diode 41. For the numerical tool control system under consideration, only the current through the potentiometer 40 and the silicon diode 41 is of interest since this represents the condition when the carriage 12 is coming into position.

The capacitor 37 has a negligible impedance at the carrier frequency while it is the determining factor in the differentiating current derived from the expression $K1 \cdot E$ where the amplitude of E will vary relatively slowly as the error signal is reduced. In this event it will be seen that the low frequency current through the resistive winding of the potentiometer 40 will be $$C \cdot K1 \cdot dE/dt$$

where C is the value of capacitance of the capacitor 37.

With the silicon diode 41 having an exponential characteristic of the form $$i = A(e^{\gamma v} - 1)$$

the dynamic resistance of the silicon diode 41 will be $$dv/di = 1/\gamma(i+A)$$

The carrier frequency voltage across the silicon diode 41 will then be essentially $$\frac{E \sin \omega t \cdot dV/di}{R + dV/di}$$

where R is the value of resistive winding of the potentiometer 40. By substitution this becomes $$\frac{E \sin \omega t}{R\gamma(i+A)+1}$$

Using the value of $i$ given above, the amplitude of the carrier voltage across the silicon diode 41 is $$\frac{E}{R\gamma CK1dE/dt + R\gamma A + 1}$$

and hence proportional to $$\frac{E}{K \cdot dE/dt + 1}$$

where as explained above K is defined by the setting of the potentiometer 26.

Thus the differentiating network 36 consisting of the capacitor 37 and the potentiometer 40 will result in a direct current through the silicon diode 41 which is closely proportional to the rate of decrease of the error signal. This current will control the electrical admittance of the silicon diode 41 to the superimposed A.C. error signal to provide a resultant signal proportional to $$\frac{E}{K \cdot dE/dt + 1}$$

for reasons explained above. The potentiometer 40 permits the mixing of this resultant signal with an undistorted signal available at the junction of the capacitor 37 and the resistive winding of the potentiometer 40.

In cases where the output is the modified signal $$\frac{E}{KdE/dt + 1}$$

without any mixing in the unmodified signal and where $KdE/dt$ is much greater than unity, the circuit 20 will serve as an automatic gain control in that the output will be only a function of the distance from the null position and of the velocity of the carriage 12 and will be relatively independent of the signal-distance ratio. This feature is particularly important where the signal-distance ratio near the null may vary up to 20% over the length of travel.

Where the output is approximately $$\frac{E}{KdE/dt}$$

and if the output signal which eventually drives the moving member 12 is proportional to the velocity at which this member 12 is driven, then the net result tends toward a constant deceleration coming into the null position, which result is often desired.

In order to block out the low frequency differentiated voltage without significantly attenuating the carrier frequency component, a two stage high pass RC filter comprising a capacitor 42, a resistor 43, and a capacitor 44 and a resistor 45 may be connected to the output of the potentiometer 40. The remaining A.C. error signal may be amplified in a triode amplifier 46 which has its output connected through a capacitor 47 to the amplifier 14. Representative values of the electrical components are shown in FIG. 2 which will provide the desired results explained above.

Thus the present invention provides a circuit to assist in the stabilization of an electro-mechanical positioning servo system where conventional means of stabilization may be impractical or too costly. Further the gain control circuit 20 modifies the electrical input signal to provide an output dependent upon the rate of decrease of input signal amplitude. Stabilization is accomplished in a null seeking servo system by reduction of the input signal, near the null, during the approach thereto. In addition, under certain conditions the gain control circuit 20 can compensate for gain variations in the input signal and cause the moving member 12 to approach its final or null position with a constant deceleration.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. An automatic gain control circuit comprising,
    (a) means for generating an A.C. error signal having a carrier component,
    (b) rectifying means responsive to said error signal for providing a half wave rectified carrier component of said error signal,
    (c) voltage dividing means responsive to said rectified error signal for providing a D.C. component of said rectified signal,
    (d) filtering means responsive to said D.C. and carrier components for attenuating said carrier component,
    (e) differentiating means responsive to said D.C. and carrier components for differentiating said D.C. component,

(f) variable impedance means responsive to said differentiated D.C. component for varying the impedance thereof in accordance with a function of the rate of change of said D.C. component, and (g) amplifying means connected to said differentiating means and to said variable impedance means for providing an output signal representative to said A.C. error signal compensated as a function of the rate of change of said D.C. component.

2. An automatic gain control circuit comprising, (a) means for generating a modulated A.C. error signal having high and low frequency components, (b) rectifying means responsive to said error signal for providing a half wave rectified modulated high frequency component of said error signal, (c) voltage dividing means responsive to said rectified error signal for providing a low frequency component of said rectified signal, (d) filtering means responsive to said high and low frequency components for attenuating said high frequency component, (e) differentiating means responsive to said high and low frequency components for differentiating said low frequency component, (f) variable impedance means responsive to said differentiated low frequency component for varying the impedance thereof in accordance with a function of the rate of change of said low frequency component, (g) amplifying means connected to said differentiating means and to said variable impedance means for providing a composite signal representative of a composite of said error signal compensated as a function of the rate of change of said low frequency component and said differentiated low frequency component, and (h) filtering means responsive to said composite signal for filtering and differentiated low frequency component for providing an output signal representative of said error signal compensated as a function of said rate of change.

3. An automatic gain control circuit comprising, (a) means for generating a modulated A.C. error signal having high and low frequency components, (b) a first rectifier responsive to said error signal for providing a half wave rectified component of said error signal, (c) a first potentiometer connected to said first rectifier for providing a low frequency component of said rectified signal, (d) RC filtering means responsive to said high and low frequency components for attenuating to said high frequency component, (e) RC differentiating means responsive to said high and low frequency components for differentiating said low frequency component, (f) second rectifying means having a non-linear impedance characteristic responsive to said differentiating low frequency component for varying the impedance thereof in accordance with the rate of decrease of said low frequency component, (g) second potentiometer connected to said differentiating means and to said second rectifier for providing a composite signal representative of said error signal compensating for the rate of decrease of said low frequency component and said differentiated low frequency component, and (h) RC filtering means connected to said second potentiometer for providing an output signal representative of said error signal compensated for the rate of decrease thereof.

4. In a numerical tool control positioning system having marginal stability and a variable servo loop gain, (a) position pickoff means for generating an A.C. error signal modulated as a function of the instantaneous displacement of a member from a predetermined position, (b) rectifying means responsive to said error signal for providing a half wave rectified modulated component of said error signal, (c) a potentiometer connected to said rectifying means for providing a low frequency component of said rectified signal in accordance with the low frequency modulation thereof, (d) filtering means connected to said rectifying means and said first potentiometer for attenuating to said high frequency of said high frequency component error signal, (e) RC differentiating means responsive to said low frequency and attenuated high frequency components of said error signal for differentiating low frequency component thereof, (f) variable admittance means responsive to said differentiated low frequency component for varying its admittance as an exponential function of the rate of decrease of said low frequency component, (g) second potentiometer means connected to said differentiating means and said variable admittance means for providing a composite signal representative of said high frequency component of said error signal corrected in accordance with the rate of decrease of said low frequency component and said differentiated low frequency component, (h) RC filtering means responsive to said composite signal for providing an output signal representative of said high frequency component of said error signal corrected for said rate of decrease of said low frequency component, and (i) servo means connected to said member for controlling said member in accordance with said high frequency component as corrected by the rate of decrease of said low frequency component.

No references cited.

BENJAMIN DOBECK, *Primary Examiner.*